United States Patent
Yoon et al.

(10) Patent No.: US 8,138,568 B2
(45) Date of Patent: *Mar. 20, 2012

(54) TRANSPARENT CARBON NANOTUBE ELECTRODE USING CONDUCTIVE DISPERSANT AND PRODUCTION METHOD THEREOF

(75) Inventors: Seon Mi Yoon, Yongin-si (KR); Jae Young Choi, Yongin-si (KR); Dong Kee Yi, Yongin-si (KR); Seong Jae Choi, Yongin-si (KR); Hyeon Jin Shin, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 209 days.

This patent is subject to a terminal disclaimer.

(21) Appl. No.: 11/735,178

(22) Filed: Apr. 13, 2007

(65) Prior Publication Data

US 2008/0088219 A1    Apr. 17, 2008

(30) Foreign Application Priority Data

Oct. 17, 2006 (KR) ................. 10-2006-0100726

(51) Int. Cl.
*H01L 31/06* (2006.01)
(52) U.S. Cl. ................... 257/461; 257/40; 438/510
(58) Field of Classification Search ............ 438/510; 257/40, 461
See application file for complete search history.

(56) References Cited

U.S. PATENT DOCUMENTS

| 6,066,442 | A | 5/2000 | Kurachi et al. |
| 6,921,575 | B2 | 7/2005 | Horiuchi et al. |
| 6,988,925 | B2 | 1/2006 | Arthur et al. |
| 7,070,753 | B2 | 7/2006 | Niu et al. |
| 7,226,818 | B2 * | 6/2007 | Malenfant et al. ............ 438/149 |
| 7,247,670 | B2 * | 7/2007 | Malenfant et al. ............ 524/496 |
| 7,261,852 | B2 | 8/2007 | Rinzler et al. |
| 7,378,040 | B2 | 5/2008 | Luo et al. |
| 7,411,085 | B2 | 8/2008 | Hirakata et al. |
| 7,456,310 | B2 | 11/2008 | Kim et al. |
| 7,563,711 | B1 | 7/2009 | Ward et al. |

(Continued)

FOREIGN PATENT DOCUMENTS

JP    2006171336    12/2004

(Continued)

OTHER PUBLICATIONS

"Biomolecules as selective dispersants for carbon nanotubes"; Authors: Moulton, et al.; Carbon, vol. 43, No. 9, pp. 1879-1884, 2005.

(Continued)

*Primary Examiner* — David Vu
*Assistant Examiner* — Caleb Henry
(74) *Attorney, Agent, or Firm* — Cantor Colburn LLP

(57) ABSTRACT

Disclosed is a transparent carbon nanotube (CNT) electrode using a conductive dispersant° The transparent CNT electrode comprises a transparent substrate and a CNT thin film formed on a surface the transparent substrate wherein the CNT thin film is formed of a CNT composition comprising CNTs and a doped dispersant. Further disclosed is a method for producing the transparent CNT electrode. The transparent CNT electrode exhibits excellent conductive properties, can be produced in an economical and simple manner by a room temperature wet process, and can be applied to flexible displays. The transparent CNT electrode can be used to fabricate a variety of devices, including image sensors, solar cells, liquid crystal displays, organic electroluminescence (EL) displays and touch screen panels, that are required to have both light transmission properties and conductive properties.

11 Claims, 3 Drawing Sheets

U.S. PATENT DOCUMENTS

| | | | |
|---|---|---|---|
| 7,593,004 | B2 | 9/2009 | Spath et al. |
| 7,645,497 | B2 | 1/2010 | Spath et al. |
| 2004/0131934 | A1* | 7/2004 | Sugnaux et al. ............ 429/209 |
| 2006/0081882 | A1 | 4/2006 | Malenfant et al. |
| 2006/0244741 | A1* | 11/2006 | Kimura et al. ................ 345/204 |
| 2006/0249203 | A1* | 11/2006 | Li et al. ......................... 136/263 |
| 2006/0261733 | A1* | 11/2006 | Suzuki et al. ................ 313/504 |
| 2008/0088219 | A1 | 4/2008 | Yoon et al. |
| 2009/0252967 | A1 | 10/2009 | Yoon et al. |

FOREIGN PATENT DOCUMENTS

| | | |
|---|---|---|
| JP | 2006-171336 A | 6/2006 |
| TW | 251354 B | 3/2006 |
| WO | 2004052559 A2 | 6/2004 |
| WO | 2007/058488 A1 | 5/2007 |

OTHER PUBLICATIONS

"Electrical and Thermal Coatings from a Single-Walled Carbon Nanotube (SWCNT)/Polymer Composite"; Authors: Caneba, et al.; Journal of Minerals & Materials Characterization & Engineering, vol. 3, No. 2, pp. 91-111, 2004.

"Reversible Intercalation of Charged Iodine Chains into Carbon Nanotube Ropes"; Authors: Grigorian, et al.; Physical Review Letters; vol. 80, No. 25, pp. 5560-5563, 1998.

"Composites of Carbon Nanotubes and Conjugated Polymers for Photovoltaic Devices"; Authors: Ago, et al.; Advanced Materials vol. 11, No. 15, pp. 1281-1285, 1999.

"Percolation in Transparent and Conducting Carbon Nanotube Networks", Authors: Hu, et al.; Nano Letters, vol. 4, No. 12, pp. 2513-2517, 2004.

"Synthesis, characterististics, and field emission of doped and de-doped polypyrrole, polyaniline, poly(3,4-ethylenedioxythiophene) nanotubes and and nanowires"; Authors: Kim, et al.; Synthetic Metals, vol. 150, No. 3, pp. 279-284, 2005.

"Dry friction and wear characteristics of nickel/carbon nanotube electroless composite deposits"; Authors: Chen, et al.; Tribology International, vol. 39, No. 1, pp. 22-28, 2005.

European Search Report dated Oct. 27, 2009.

"Transparent and Flexible Carbon Nanotube Transistors"; Authors: E. Artukovic, et al.; Nano Letters, 2005, vol. 5, No. 4, pp. 757-760.

Artukovic, et al., "Transparent and Flexible Carbon Nanotube Transistors," Nano Letters, 5(4): 757-760 (2005).

Kim, et al., "Rapid Fabrication of Two- and Three-Dimensional Colloidal Crystal Films via Confined Convective Assembly," Adv. Funct. Mater, 15: 1329-1335 (2005).

Examination of Application No. 07116655.7-2208 dated Mar. 17, 2011.

* cited by examiner

TRANSPARENT CARBON NANOTUBE ELECTRODE USING CONDUCTIVE DISPERSANT AND PRODUCTION METHOD THEREOF

This non-provisional application claims priority to Korean Patent Application No. 10-2006-0100726 filed on Oct. 17, 2006, and all the benefits accruing therefrom under 35 U.S.C.§119(a), the content of which is herein incorporated by reference in its entirety.

BACKGROUND OF THE INVENTION

1. Field of the Invention

The present invention relates to a transparent carbon nanotube ("CNT") electrode comprising a conductive dispersant and a method for producing the same. More specifically, the present invention relates to a transparent CNT electrode comprising a transparent substrate and a CNT thin film formed on a surface of the transparent substrate wherein the CNT thin film contains carbon nanotubes ("CNTs") and a doped dispersant, and a method for producing the transparent CNT electrode. The transparent CNT electrode of the present invention can be produced by a wet process, has excellent conductive properties, and can be applied to flexible displays.

2. Description of the Related Art

Transparent electrodes having a transparent substrate and a conductive film formed on the transparent substrate are now widely used to fabricate a variety of devices, including image sensors, solar cells, liquid crystal displays, organic electroluminescence ("EL") displays and touch screen panels, that are required to have both light transmission properties and conductive properties.

Indium tin oxide ("ITO") electrodes have been predominantly used as electrodes for transparent substrates because ITO shows a strong tendency to form a thin film on glass substrates and exhibits excellent light transmission properties and conductive properties. Vacuum deposition equipment is used to produce ITO electrodes. Particularly, sputtering equipment can be used in view of the excellent characteristics conveyed to the film by the sputtering technique. However, production of transparent electrodes by sputtering techniques requires a high processing temperature of 200° C. or higher, sometimes 400° C. or higher. Therefore, sputtering techniques are not suitable for the production of flexible displays that require transparent electrodes. Moreover, the use of the inflexible ITO electrodes in flexible displays causes increased sheet resistance and poor durability which is problematic for flexible displays.

To address these problems, extensive research is actively underway to investigate use of transparent electrodes based on carbon nanotubes (CNTs) as materials for conductive films formed on transparent substrates.

Carbon nanotubes (CNTs) are tubular materials made of carbon atoms in which one carbon atom is bonded to other adjacent carbon atoms in the form of a hexagonal-based honeycomb structure. CNTs are highly anisotropic, have various structures, such as single-walled, double-walled, multi-walled and rope (i.e., helical) structures, and have an extremely small diameters in the nanometer ($1 \times 10^{-9}$ meter) range. CNTs are known to have excellent mechanical properties, good electrical selectivity, superior field emission properties, highly efficient hydrogen storage properties, and the like. Particularly, CNTs can be advantageously used to form electrically conductive films due to their high electrical conductivity. CNTs can be synthesized by known methods including electrical discharge, pyrolysis, laser deposition, plasma chemical vapor deposition, thermal chemical vapor deposition, or electrolysis.

CNTs must be dispersed in suitable dispersion media in order to form conductive films. However, CNTs tend to aggregate by surface attraction, in particular by the intermolecular force referred to as Van der Waals attraction, where CNT's have a Van der Waals attraction of about 950 meV/nm. Since such aggregation of CNTs impedes the formation of three-dimensional networks that are capable of improving the mechanical strength and conductive properties of the CNTs, it is necessary to disperse the CNTs in suitable dispersion media.

Since most organic dispersants act as insulators, CNT thin films formed using organic dispersants generally exhibit poor conductive properties. Various efforts have been made to remove residual organic materials, which can act as insulators, from CNT films. For example, after a dispersion of CNTs and an organic material in water is used to form a CNT film, the organic material is removed from the film by dipping the film in water (*Nano letters* 2005, Vol. 5, No. 4, pp. 757-760). However, this method has difficulty in completely removing the organic material from the CNT film and ensuring reproducibility.

Further, although CNTs may be sufficiently dispersed in the conductive dispersant to form a conductive film, deterioration in the conductivity of the conductive film is inevitable because the conductive dispersant surrounds the surface of the CNTs and the conductivity of the conductive dispersant is much lower than that of the CNTs.

BRIEF SUMMARY OF THE INVENTION

Therefore, in view of the problems of the prior art, the present invention provides a transparent CNT electrode that can be applied to flexible displays and has increased conductivity.

In another aspect of the present invention a method is provided for producing the transparent CNT electrode.

In an embodiment, there is provided a transparent CNT electrode comprising a transparent substrate and a CNT thin film formed on a surface of the transparent substrate wherein the CNT thin film is formed of a CNT composition comprising CNTs and a doped dispersant.

In another embodiment, the substrate can be a transparent inorganic substrate, including a glass or quartz substrate, or a flexible transparent substrate made of a material selected from the group consisting of polyethylene terephthalate, polyethylene naphthalate, polyether sulfone, polycarbonate, polystyrene, polypropylene, polyester, polyimide, polyetheretherketone, polyetherimide, acrylic resins, olefin-maleimide copolymers and norbornene-based resins.

In a further embodiment of the present invention, the CNTs used in the CNT composition are selected from the group consisting of single-walled carbon nanotubes, double-walled carbon nanotubes, multi-walled carbon nanotubes, rope carbon nanotubes, and combinations thereof.

In another embodiment of the present invention, the doped dispersant can be a conductive dispersant. The conductive dispersant can have a structure that includes a head containing an aromatic ring with a high affinity for the CNTs and one tail or two tails that are the same or different, and with an affinity for a dispersion medium.

In an embodiment, a method for producing a transparent CNT electrode comprises (a) preparing a CNT composition comprising a CNT and a conductive dispersant, (b) forming a CNT thin film containing a conductive dispersant on a surface of a transparent substrate with the CNT composition, and (c) doping the conductive dispersant contained in the CNT thin film.

In another embodiment, step (c) can include the sub-steps of i) doping the CNT thin film formed on the transparent substrate in a dopant solution, ii) washing excess dopant remaining in the CNT thin film, and iii) drying the doped CNT thin film.

In an alternative embodiment of the present invention, step (c) can be carried out with a vapor of iodine, bromine, chlorine, iodine monochloride, iodine trichloride, or iodine monobromide.

BRIEF DESCRIPTION OF THE DRAWINGS

The above and other features and other advantages of the present invention will be more clearly understood from the following detailed description taken in conjunction with the accompanying drawings, in which.

DETAILED DESCRIPTION OF THE INVENTION

Figure 1:
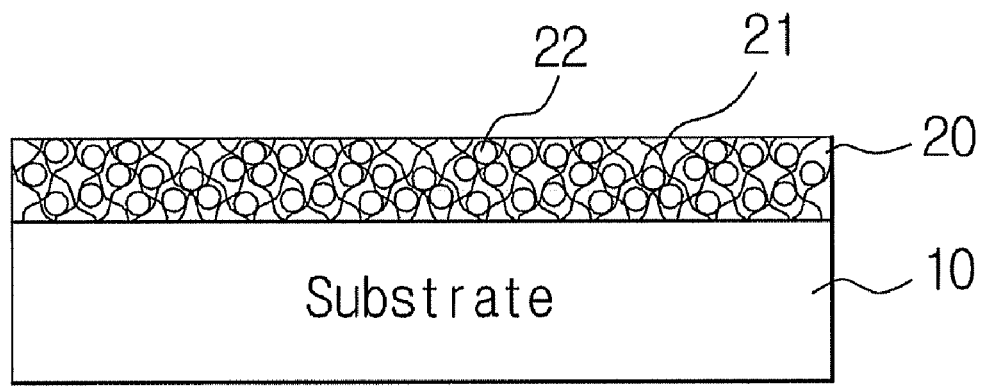
FIG. 1 is a schematic cross-sectional view of an exemplary transparent CNT electrode according to an embodiment.

The present invention will now be described in greater detail with reference to the accompanying drawings.

It will be understood that when an element is referred to as being "on" another element, it can be directly on the other element or intervening elements may be present therebetween. In contrast, when an element is referred to as being "disposed on" or "formed on" another element, the elements are understood to be in at least partial contact with each other, unless otherwise specified.

The terminology used herein is for the purpose of describing particular embodiments only and is not intended to be limiting of the invention. As used herein, the singular forms "a", "an" and "the" are intended to include the plural forms as well, unless the context clearly indicates otherwise. The use of the terms "first", "second", and the like do not imply any particular order but are included to identify individual elements. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements and the thicknesses of layers and regions are exaggerated for clarity.

In one aspect, a transparent CNT electrode comprises a transparent substrate and a CNT thin film formed on the transparent substrate. The CNT thin film contains carbon nanotubes (CNTs) and a doped dispersant. The use of the doped dispersant, particularly a doped conductive dispersant, in the transparent CNT electrode facilitates migration of charges between the CNTs to achieve excellent conductive properties of the transparent CNT electrode without any deterioration in light transmittance. In addition, since the transparent CNT electrode of the present invention can be produced by wet process at room temperature, it can be applied to flexible substrates. As a result, the transparent CNT electrode is useful in a wide range of applications.

FIG. 1 is a schematic cross-sectional view of a transparent CNT electrode according to an embodiment.

As shown in FIG. 1, the transparent CNT electrode of the present invention comprises a transparent substrate 10 and a CNT thin film 20 disposed on a surface of transparent substrate 10, wherein the CNT thin film contains CNTs 21 and a doped dispersant 22.

The transparent substrate 10 used in the transparent CNT electrode can be of any type so long as it is transparent, specific examples of which include transparent inorganic substrates, such as glass and quartz substrates, and flexible transparent substrates, such as plastic substrates. Examples of suitable materials for the flexible transparent substrates include polyethylene terephthalate, polyethylene naphthalate, polyether sulfone, polycarbonate, polystyrene, polypropylene, polyester, polyimide, polyetheretherketone, polyetherimide, acrylic resins, olefin-maleimide copolymers, and norbornene resins. These materials can be used either alone or in a combination thereof.

The CNTs 21 used in the CNT composition constituting the CNT thin film is not particularly restricted so long as the advantages of the present invention are not impaired. Specifically, the CNTs 21 can be selected from the group consisting of single-walled carbon nanotubes, double-walled carbon nanotubes, multi-walled carbon nanotubes, rope carbon nanotubes, and combinations thereof. Where single-walled carbon nanotubes are desired for use, metallic carbon nanotubes can be selectively separated by a chemical separation process before use.

The dispersant used to disperse the CNTs is not particularly restricted. In an embodiment, the dispersant can be a conductive dispersant. The conductive dispersant can have a structure that consists of a head containing an aromatic ring with a high affinity for the CNTs and one tail or two tails that are the same or different, and with an affinity for the dispersion medium.

More specifically, the conductive dispersant may be a compound having a structure in which a head selected from groups represented by Formula 1 is substituted with one tail or two tails that are the same or different, and selected from groups represented by Formula 2:

$$[Ar-(X)_a]_l \quad (1)$$

wherein Ar is a $C_6$ aromatic group or a $C_4$-$C_5$ heteroaromatic group containing at least one heteroatom selected from sulfur (S), nitrogen (N) or oxygen (O), X is NH— or CH=CH—, a is 0 or 1, and l is an integer from 5 to 60;

Structural Formula 1:

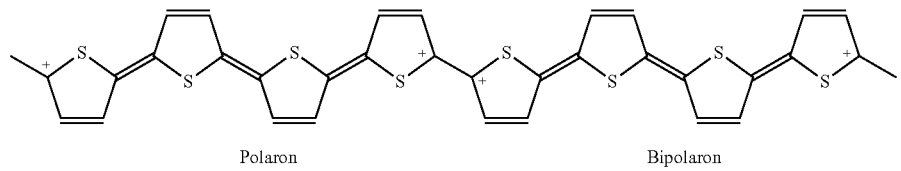

Polaron                              Bipolaron

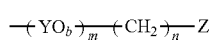 (2)

wherein Y is selected from the group consisting of substituted and unsubstituted $C_1$-$C_{10}$ alkylene groups, substituted and unsubstituted $C_1$-$C_{10}$ alkenylene groups, substituted and unsubstituted $C_1$-$C_{10}$ alkynylene groups, and substituted and unsubstituted $C_6$-$C_{20}$ arylalkylene groups, Z is selected from the group consisting of —H, —$CH_3$, —OH, carboxylic acid and its salts, sulfonic acid and its salts, and phosphoric acid and its salts, b is 0 or 1, m is an integer from 1 to 9, and n is an integer from 0 to 9.

The conductive dispersant can also be poly(3,4-ethylenedioxythiophene). In an embodiment, the head of the dispersant is polythiophene.

The dispersant exists in a doped state. Generally, the surface of the CNTs contained in the CNT thin film is surrounded by the dispersant. Since the dispersant has a lower conductivity than the CNTs, it functions as an insulator between the CNTs, resulting in a decrease in the total conductivity of the CNT thin film.

The use of the doped dispersant in the transparent CNT electrode facilitates migration of the CNTs to achieve improved conductive properties of the CNT thin film. The mechanism responsible for the improvement in conductive properties will be explained in greater detail below.

The conductive dispersant has the same composition as a conductive polymer. Depending on the dispersion medium and the CNTs used, the molecular weight of the conductive dispersant is controlled and one or two functional groups (which correspond to the tails of the dispersant) are introduced into the conductive dispersant. The conductive dispersant has basic characteristics similar to those of a conductive polymer. That is, a conductive polymer has a conjugated structure in which single bonds and double bonds are alternately repeated, and generally exhibits insulator (or semiconductor) properties. However, when a conductive polymer is chemically treated (i.e., is doped), its properties changed from insulator (or semiconductor) properties to conductor (or semiconductor) properties. This chemical treatment (i.e., doping) allows each bond between successive carbon atoms of the conductive polymer to have about one and a half bonds (i.e., a bond order of about 1.5) instead of single bonds (a bond order of 1) and double bonds (a bond order of 2) alternately repeated in the conjugated structure, so that the electron density of the conductive polymer is delocalized, thereby facilitating the intramolecular and intermolecular migration of electrons. For example, the following Structural Formula 1 shows the states of polarons and bipolarons acting as charge carriers when a polythiophene polymer is doped.

The type of dopant performing the above functions in the transparent CNT electrode of the present invention is not especially restricted. As the dopant, a p-type dopant (an electron acceptor) or an n-type dopant (an electron acceptor) can be used.

Specific examples of suitable p-type dopants that can be used include, but are not limited to, Lewis acids such as for example $PF_5$, $AsF_5$, $SbF_5$, $ClO_4^-$, $BF_4^-$, $BF_3$, $BCl_3$, $BBr_3$, $SO_3$, $NO_2(SbF_6)$, $NO(SbCl_6)$, or $NO_2(BF_4)$; protic acids such as for example $H_2SO_4$, $HClO_4$, $HNO_3$, $FSO_3H$, or $CF_3SO_3H$; transition metal halides such as for example $FeCl_3$, $MoCl_5$, $WCl_5$, $SnCl_4$, $MoF_5$, $RuF_5$, $TaBr_5$ and $SnI_4$; noble metal halides such as for example $AuCl_3$ and $HAuCl_4$; or organic materials such as for example benzoquinone, tetrachlorobenzoquinone, tetracyanoquinodimethane, or dichlorodicyanobenzoquinone. Specific examples of suitable n-type dopants that can be used in the present invention include, but are not limited to, alkali metals such as for example Li, Na, K, or Cs, or alkylammonium ions such as for example tetraethylammonium ions or tetrabutylammonium ions.

The CNTs and the dispersant may be mixed in a weight ratio of, but not limited to, 1:0.005 to 1:100. If the dispersant is used in an amount of less than the lower limit defined in the range, optimum dispersion effects of the CNTs cannot be attained. Meanwhile, if the dispersant is used in an amount exceeding the upper limit defined by the range, there is a possibility that the high conductivity of the CNTs may decrease, causing negative effects.

The transmittance of the CNT thin film can be appropriately determined by those skilled in the art according to the intended applications and needs. For example, to use the CNT thin film as a transparent electrode, it is desirable to adjust the visible light transmittance of the CNT thin film to 60% or more and preferably 75% or more at a wavelength of 550 nm or 600 nm, at a CNT thin film thickness of about 150 nm.

The CNT transparent electrode using the doped dispersant exhibits excellent conductive properties, can be applied to various kinds of substrates, including flexible substrates, and is useful in a wide range of applications, for example, as a transparent electrode of a device, such as an image sensor, a solar cell, a liquid crystal display, an organic electroluminescence ("EL") display or a touch screen panel.

The transmittance of the structure comprising the CNT thin film and transparent substrate can also be appropriately determined by those skilled in the art according to the intended applications and needs. For example, to use the CNT thin film and transparent substrate as a transparent electrode, it is desirable to have a visible light transmittance of the structure comprising the CNT thin film and transparent substrate of 60% or more, preferably 75% or more, at a wavelength of 550 nm or 600 nm, at a CNT film thickness of about 150 nm and a transparent substrate thickness of about 150 μm.

In another aspect, the present invention is directed to a method for producing the transparent CNT electrode. The method comprises (a) preparing a CNT composition for the formation of a CNT thin film, (b) forming a CNT thin film containing a conductive dispersant on a surface of the transparent substrate using the CNT composition, and (c) doping the CNT thin film formed on the transparent substrate in a dopant solution to dope the conductive dispersant contained in the CNT thin film.

Materials used in the respective steps are as described above. A more detailed explanation of the respective steps of the method will be given below.

Step (a): Preparation of CNT Composition for the Formation of CNT Thin Film.

First, a dispersant is dissolved in a dispersion medium selected from organic solvents, water, and mixtures thereof to prepare a dispersant solution. CNTs and the dispersant solution are used to prepare a CNT composition.

Dispersion media that can be used to prepare the CNT composition include, but are not limited to, organic solvents, water, mixtures of two or more organic solvents, and mixtures of at least one polar organic solvent (e.g., hydroxyl-containing organic solvents) and water.

Any organic solvent that is commonly used in the art may be used. Examples of suitable organic solvents include alcohols, ketones, glycols, glycol ethers, glycol ether acetates, acetates, and terpineols. These organic solvents can be used alone or in combination.

In an embodiment, the concentration of the dispersant in the dispersant solution can be in the range of about 0.000025% to about 50% by weight based on the total weight of dispersant and dispersant medium, and the CNTs are present in the CNT composition an amount of about 0.005% to about 1% by weight, based on the total weight of CNT and dispersant solution. Another solvent may be used to dilute the CNTs in the CNT composition depending on the mode of formation of a thin film.

Step (b): Formation of CNT Thin Film Containing the Conductive Dispersant on Transparent Substrate Using the CNT Composition.

In this step, the CNT composition prepared in step (a) is used to form a CNT thin film containing the conductive dispersant on a surface of the transparent substrate.

The formation of a CNT thin film on a surface of the transparent substrate may be achieved by depositing the CNT composition by a general coating technique, such as spin coating, spray coating, filtration, or bar coating. In an embodiment, a suitable coating technique can be selected depending on the characteristics of the solution and intended applications.

The surface of the transparent substrate can, prior to deposition of the CNT composition, be pretreated by a conventional process, such as for example, but not limited to, $O_2$ plasma treatment.

The transmittance of the CNT thin film can be appropriately determined by those skilled in the art according to the intended applications and needs. For example to use the CNT thin film in a transparent electrode, it is desirable to adjust the visible light transmittance of the CNT thin film to 60% or more and preferably 75% or more at a wavelength of 550 nm or 600 nm, at a CNT thin film thickness of about 150 nm The transmittance of the CNT thin film electrode structure comprising the CNT thin film and transparent substrate can be appropriately determined by those skilled in the art according to the intended applications and needs. In order to use the CNT thin film and transparent substrate as a transparent electrode, it is desirable to have a visible light transmittance of the CNT thin film and transparent substrate of 60% or more, preferably 75% or more, at a wavelength of 550 nm or 600 nm, at a CNT film thickness of 150 nm and a transparent substrate thickness of about 150 μm.

Step (c): Doping of the Conductive Dispersant Contained in the CNT Thin Film.

In this step, the dispersant contained in the CNT thin film is doped using a dopant solution to increase the conductivity of the CNT thin film.

The doping of the dispersant can be performed by a chemical process, such as a solution or vapor process.

In an embodiment, in the solution process, step (c) can include the sub-steps of i) doping the transparent substrate having the CNT thin film formed thereon in a dopant solution, ii) washing the dopant remaining in the CNT thin film, and iii) drying the doped CNT thin film.

The doping can be achieved by a general doping technique, such as dipping, spin coating or spray. For example, doping of the conductive dispersant by the solution process is achieved by dipping the CNT thin film in a dopant solution for a specified time, preferably about 10 minutes to about 24 hours, and washing the doped CNT thin film by a technique known in the art to remove the dopant remaining in the CNT thin film. For example, in an embodiment, the washing is performed by dipping the doped CNT thin film in a nitromethane solution for about 10 minutes to about 24 hours.

Thereafter, the washed CNT thin film is dried by a common drying technique to complete the doping of the conductive dispersant. At this time, the drying is preferably performed at about 80° C. for about 2 hours and at room temperature for about 6 hours, sequentially. The drying time and temperature can be appropriately adjusted and controlled depending on the solvent present in the dopant solution.

In another embodiment, in the vapor process, step (c) can be carried out by placing the transparent substrate having the CNT thin film formed thereon in a reactor, filling the reactor with a halogen gas selected from iodine ($I_2$), bromine ($Br_2$), chlorine ($Cl_2$), iodine monochloride (ICl), iodine trichloride ($ICl_3$) or iodine monobromide (IBr), and exposing the transparent substrate to the halogen gas for about one hour or more, but is not limited to this procedure.

Hereinafter, the present invention will be explained in greater detail with reference to the following examples. However, these examples are given for the purpose of illustration and are not to be construed as limiting the scope of the invention.

EXAMPLES

Example 1 i) Formation of CNT Thin Film 20 mg of a conductive dispersant represented by Formula 3 was dissolved in 20 ml of water, and then 20 mg of purified SWCNTs (single-walled carbon nanotubes) synthesized by an Arc-discharge process (Grade ASP-100F, ILJIN Nanotech Co., Ltd.) was added to the solution.

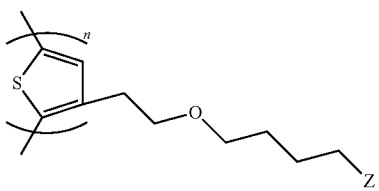

(3)

For a conductive dispersant of Formula (3), Z is selected from the group consisting of —H, —CH$_3$, —OH, carboxylic acid and its salts, sulfonic acid and its salts, and phosphoric acid and its salts, and n is an integer. For the present Example 1, Z in Formula (3) is a sulfonic acid sodium salt group, to provide the exemplary conductive dispersant, as used herein, having Formula (4).

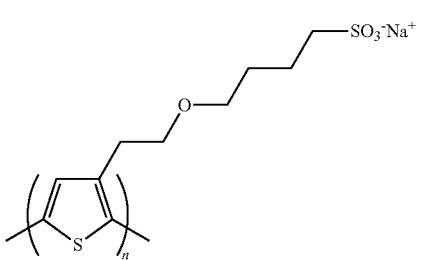

(4)

The conductive dispersant of Formula (4) as used herein had a molecular weight of 10,000 (n=37). The mixture was dispersed in a sonic bath for 10 hours, and centrifuged at 10,000 rpm for 10 minutes to prepare a CNT composition.

The CNT composition thus prepared was subjected to filtration to form a CNT layer on a transparent polyester film as a transparent substrate, and dried at 60° C. for 2 hours. The visible light transmittance of the resulting structure was measured to be 77% at 600 nm, at a CNT film thickness of 150 nm and a thickness of the transparent polyester substrate of 150 µm.

ii) Doping of CNT Thin Film

The resulting structure was dipped in a 0.25 M nitromethane solution of 2,3-dichloro-5,6-dicyano-p-benzoquinone ("DDQ") as a dopant for 4 hours and washed in a nitromethane solution for 12 hours to remove the dopant remaining in the CNT thin film. Thereafter, the washed structure was dried at 80° C. for 2 hours and at room temperature for 6 hours sequentially to produce a transparent CNT electrode.

Example 2

A transparent CNT electrode was produced in the same manner as in step i) of Example 1, except that a 0.1 M nitromethane solution of gold trichloride (AuCl$_3$) was used as the dopant solution.

Figure 2:
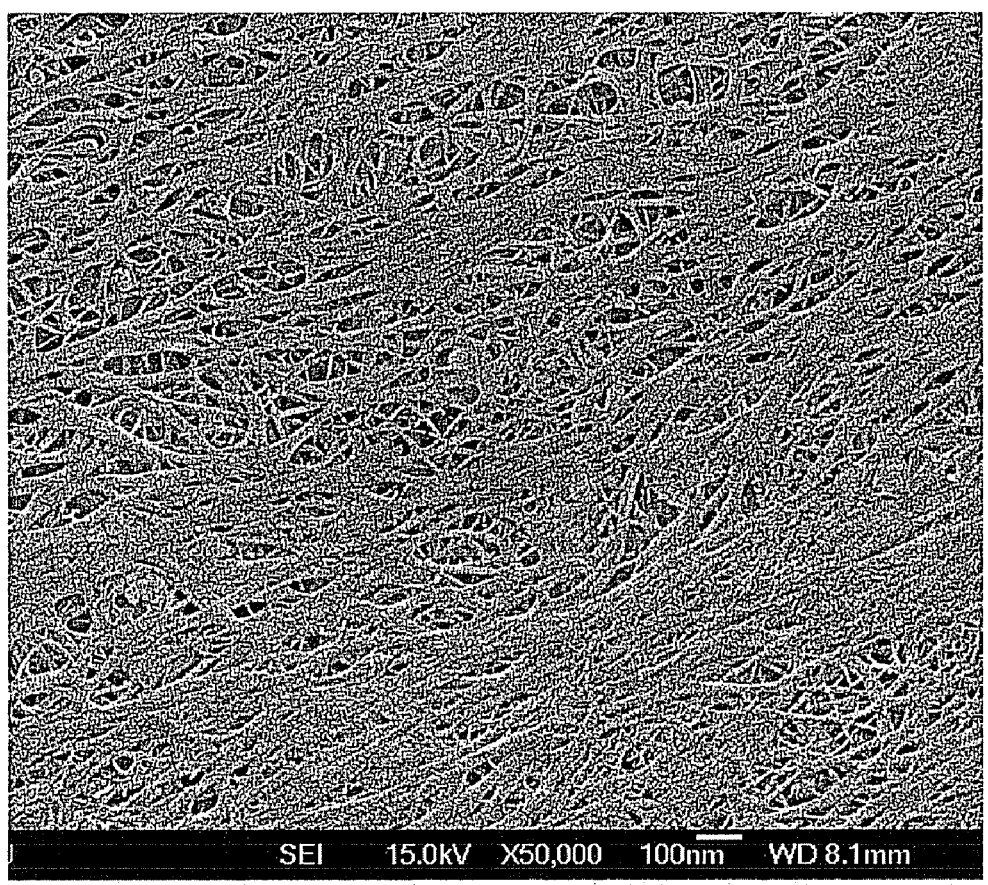
FIG. 2 is a scanning electron micrograph ("SEM") showing a surface of an exemplary transparent CNT electrode produced in Example 1.
Figure 3A:
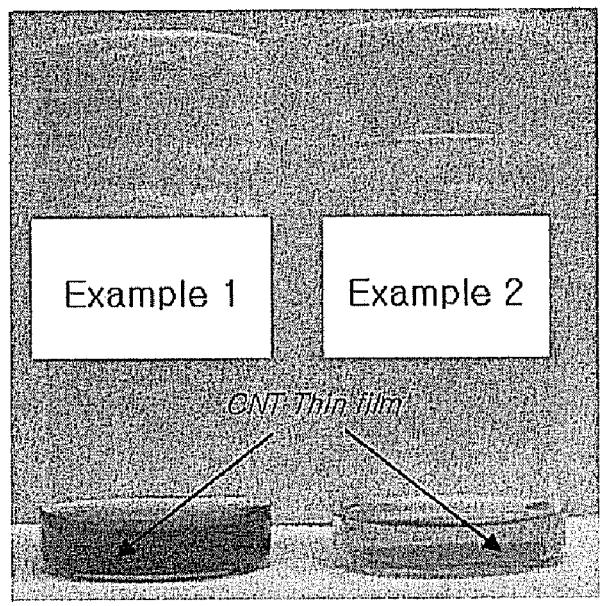
FIG. 3a is a photograph showing the state in which CNT thin films are dipped in different dopant solutions during doping of the CNT thin films to produce the exemplary transparent CNT electrodes in Examples 1 and 2 of the present invention.
Figure 3B:
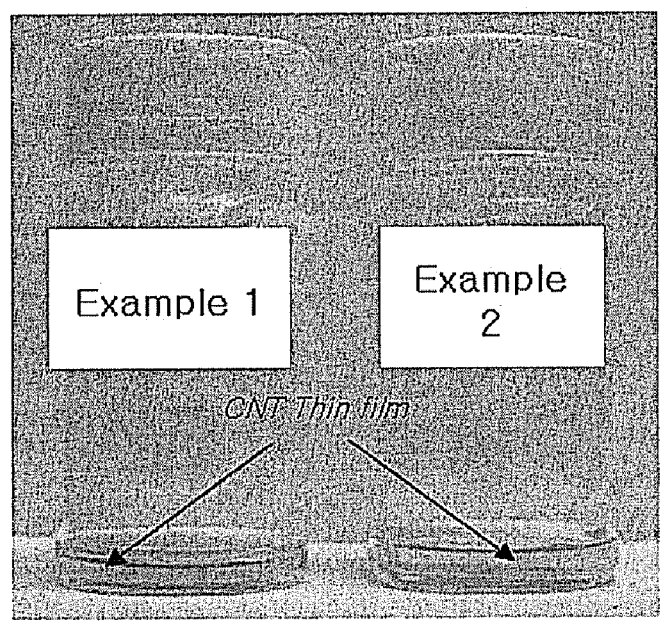
FIG. 3b is a photograph showing the state in which CNT thin films are washed during doping of the CNT thin films to produce the exemplary transparent CNT electrodes in Examples 1 and 2.

The sheet resistance was measured for a transparent CNT electrode produced in the same manner as in step i) of Example 1 but without doping (i.e., before doping), and for the transparent CNT electrodes produced in Examples 1 and 2 after doping, and a comparison of the results are shown in Table 1. The surface of the transparent CNT electrode produced in Example 1 was observed by scanning electron microscopy (SEM) (FIG. 2).

TABLE 1

| Transparent CNT Electrode[a] | | Sheet resistance (Ω/sq.) | Relative value (%) |
|---|---|---|---|
| Before doping | | 817 | 100 |
| After doping | Example 1 | 394 | 48.27 |
| | Example 2 | 111 | 13.59 |

[a]The CNT electrodes have a visible light transmittance of 77% measured at 600 nm and a CNT thin film thickness of 150 nm and a transparent polyester substrate thickness of 150 µm.

Evaluation of Physical Properties of the Transparent Electrodes.

(1) Measurement of Transmittance

The transmittance of the transparent electrode structure consisting of the CNT thin film and transparent substrate was measured using a UV-Visible spectrophotometer, at a CNT thin film thickness of 150 nm and a transparent substrate thickness of 150 µm.

(2) Measurement of Sheet Resistance

The sheet resistance (Ω/sq.) of the transparent electrodes was determined using a four-point probe.

As can be seen from the results of Table 1, the sheet resistance values of the transparent CNT electrodes measured after doping were reduced by an amount greater than about 50% and less than about 90% when compared with those of the transparent CNT electrodes measured before doping. From the results, it can be confirmed that when the transparent CNT electrodes are used as transparent electrodes of devices, such as image sensors, solar cells and liquid crystal displays, excellent characteristics of conductivity, transparency, and flexibility where desired can be imparted to the devices.

Example 3

Figure 4:
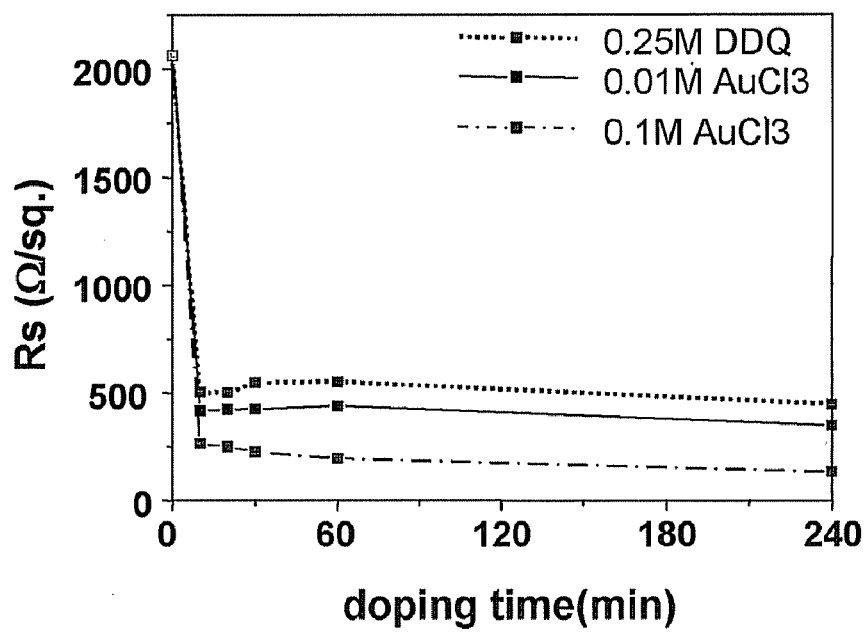
FIG. 4 is a graph showing doping effects for the exemplary transparent CNT electrodes produced in Example 3 according to the concentration of dopant solutions and doping time.

Transparent CNT electrodes were produced in the same manner as in Example 1, except that CNT thin films were formed on respective PET films treated with O$_2$ plasma by spin coating. The transparent CNT electrodes thus produced had a visible light transmittance of 79.51% at 600 nm at a CNT thin film thickness of 150 nm and a PET film thickness of 150 µm. The transparent CNT electrodes were used to analyze effects according to the concentration of dopant solutions and the penetration time of dopants. At this time, nitromethane solutions having different concentrations (0.01 M and 0.1 M) of gold trichloride (AuCl$_3$) were used as dopant solutions, dipping was performed for different times (10 minutes, 20 minutes, one hour, and 4 hours), and washing was performed by rinsing with a nitromethane solution three times and dipping in the rinsing solution for one hour. The washed structures were dried overnight at room temperature. The transmittance and sheet resistance of the transparent CNT electrodes were measured by the procedure described in Example 1, and the results are shown in FIG. 4 and Table 2.

TABLE 2

| Dopant | Doping time | Transmittance[b] (%) | Sheet resistance (Ω/sq.) | Relative Sheet resistance (Rs) value (% of reference) |
|---|---|---|---|---|
| Reference (No doping) | X | 79.51 | 2061.15 | 100 |
| 0.01 M AuCl$_3$ | 10 min. | 84.76 | 416.76 | 20 |
| | 20 min. | 83.56 | 423.56 | 21 |

TABLE 2-continued

| Dopant | Doping time | Transmittance[b] (%) | Sheet resistance (Ω/sq.) | Relative Sheet resistance (Rs) value (% of reference) |
|---|---|---|---|---|
| | 30 min. | 83.90 | 425.82 | 21 |
| | 1 hr. | 84.96 | 439.41 | 21 |
| | 4 hr. | 85.38 | 346.55 | 17 |
| 0.1 M AuCl$_3$ | 10 min. | 86.48 | 265.01 | 13 |
| | 20 min. | 86.31 | 249.15 | 12 |
| | 30 min. | 88.18 | 226.50 | 11 |
| | 1 hr. | 85.77 | 194.79 | 9 |
| | 4 hr. | 86.57 | 131.37 | 6 |

[b]measured at 600 nm, a CNT thin film thickness of 150 nm, and a transparent polyester substrate thickness of 150 μm.

Example 4

Figure 5:
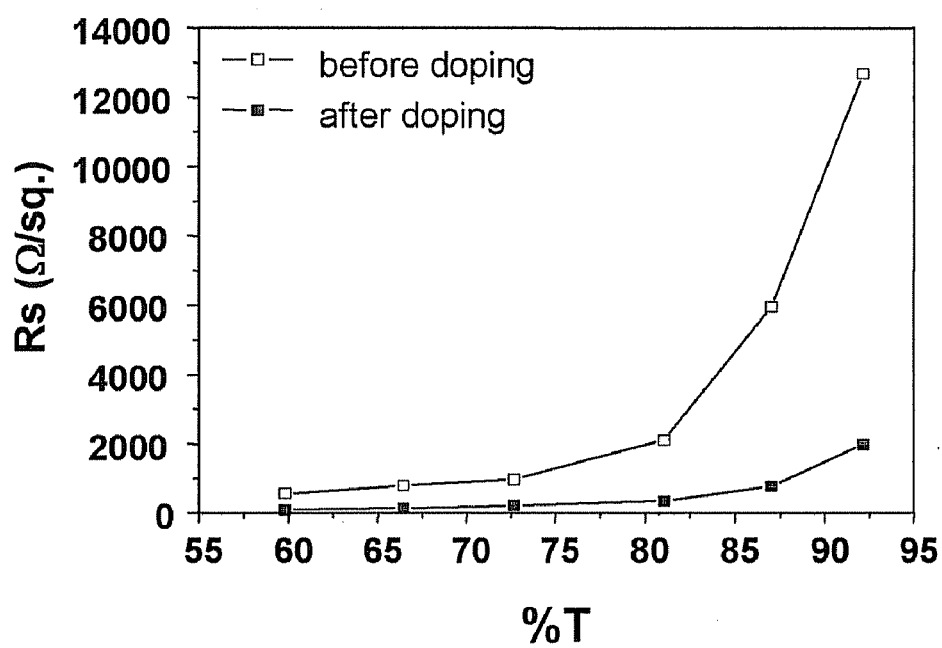
FIG. 5 is a graph showing doping effects for the exemplary transparent CNT electrodes produced in Example 4 with varying light transmittance values of the transparent CNT electrodes.

Five transparent CNT electrodes with different transmittance values were produced in the same manner as in Example 1, except that the contents of CNTs were varied, a 0.1 M nitromethane solution of gold trichloride (AuCl$_3$) was used as the dopant solution, and CNT thin films were formed on respective PET films treated with O$_2$ plasma by spin coating. The transparent CNT electrodes were used to analyze the doping effects with varying transmittance values. The transmittance (% T) and sheet resistance (Rs) of the transparent electrodes were measured by the procedure described in Example 1, and the results are shown in FIG. 5 and Table 3.

TABLE 3

| Sample No. | Transmittance[c] (%) | Sheet resistance (Ω/sq.) Before doping | Sheet resistance (Ω/sq.) After doping | Relative Sheet Resistance (Rs) value (% of before doping resistance) |
|---|---|---|---|---|
| 1 | 86.9 | 1291.62 | 855.8 | 66.6 |
| 2 | 85.7 | 933.59 | 739.1 | 55.2 |
| 3 | 81.6 | 650.34 | 536.8 | 69.7 |
| 4 | 75.8 | 555.17 | 311.2 | 35.0 |
| 5 | 74.5 | 387.49 | 272.3 | 77.9 |

[c]measured at 600 nm, a CNT thin film thickness of 150 nm and a transparent polyester substrate thickness of 150 μm.

The sheet resistance values of the transparent CNT electrodes produced according to the above method decreased by an average of greater than 60% over the entire range of transmittance values, regardless of changes in the transmittance of the transparent electrode structures.

Although the preferred embodiments of the present invention have been disclosed for illustrative purposes, those skilled in the art will appreciate that various modifications and variations are possible, without departing from the scope and spirit of the invention as disclosed in the appended claims. Accordingly, such modifications and variations are intended to come within the scope of the claims.

As apparent from the above description, according to the transparent CNT electrode of the present invention, a doped dispersant is used to considerably increase the conductivity of a CNT thin film. Accordingly, the transparent CNT electrode of the present invention is useful in a wide range of applications, for example, as a transparent electrode of a device. In addition, the transparent CNT electrode of the present invention can be produced in a simple manner by a room temperature wet process without involving a sputtering process requiring expensive vacuum equipment, which is efficient in terms of production cost and processing, and exhibits excellent characteristics, such as high transmittance and low resistance.

Furthermore, the transparent electrode of the present invention can be used as a flexible transparent electrode of a flexible display such as that currently in the spotlight as a next-generation display.

What is claimed is:

1. A transparent CNT electrode comprising a transparent substrate and a transparent CNT thin film directly on a surface of the transparent substrate,
   wherein the transparent CNT thin film is a CNT composition comprising CNTs and a doped dispersant,
   wherein the transparent substrate is a transparent inorganic substrate selected from glass or quartz substrates, or a flexible transparent substrate made of a material selected from the group consisting of polyethylene terephthalate, polyethylene naphthalate, polyether sulfone, polycarbonate, polystyrene, polypropylene, polyester, polyimide, polyetheretherketone, polyetherimide, acrylic resins, olefin-maleimide copolymers, and norbornene resins, and
   wherein the transparent CNT electrode has a visible light transmittance of 60% or more at a wavelength of 550 nm or 600 nm measured at a transparent CNT thin film thickness of about 150 nm and a transparent substrate thickness of about 150 μm.

2. The transparent CNT electrode according to claim 1, wherein the single-walled carbon nanotubes are metallic carbon nanotubes.

3. The transparent CNT electrode according to claim 1, wherein the doped dispersant is a conductive dispersant.

4. The transparent CNT electrode according to claim 3, wherein the conductive dispersant is poly(3,4-ethylenedioxythiophene), a compound having a structure in which a head selected from groups represented by Formula 1 is substituted with one tail or two tails that are the same or different, and selected from groups represented by Formula 2:

$$[\text{Ar}—(\text{X})_a]_l \quad \text{(Formula 1)}$$

wherein Ar is a C$_6$ aromatic group or a C$_4$-C$_5$ heteroaromatic group containing at least one heteroatom selected from sulfur (S), nitrogen (N) and oxygen (O),
X is NH— or CH=CH—,
a is 0 or 1, and
l is an integer from 5 to 60,

$$\text{—}(\text{YO}_b)_m\text{—}(\text{CH}_2)_n\text{—Z} \quad (2)$$

wherein Y is selected from the group consisting of substituted and unsubstituted C$_1$-C$_{10}$ alkylene groups, substituted and unsubstituted C$_1$-C$_{10}$ alkenylene groups, substituted and unsubstituted C$_1$-C$_{10}$ alkynylene groups and substituted and unsubstituted C$_6$-C$_{20}$ arylalkylene groups,
Z is selected from the group consisting of —H, —CH$_3$, —OH, carboxylic acid and its salts, sulfonic acid and its salts, and phosphoric acid and its salts,
b is 0 or 1,
m is an integer from 1 to 9, and
n is an integer from 0 to 9.

5. The transparent CNT electrode according to claim 1, wherein the CNTs and the doped dispersant are mixed in a weight ratio of 1:0.005 to 1:100.

6. The transparent CNT electrode according to claim 1, wherein the doped dispersant is a dispersant doped with a p-type dopant selected from the group consisting of Lewis acids, protic acids, transition metal halides, noble metal halides, or organic materials; or an n-type dopant selected from the group consisting of alkali metals, or alkylammonium ions.

7. The transparent CNT electrode according to claim 6, wherein the Lewis acids include $PF_5$, $AsF_5$, $SbF_5$, $ClO_4^-$, $BF_4^-$, $BF_3$, $BCl_3$, $BBr_3$, $SO_3$, $NO_2(SbF_6)$, $NO(SbCl_6)$, or $NO_2(BF_4)$, the protic acids include $H_2SO_4$, $HClO_4$, $HNO_3$, $FSO_3H$, or $CF_3SO_3H$, the transition metal halides include $FeCl_3$, $MoCl_5$, $WCl_5$, $SnCl_4$, $MoF_5$, $RuF_5$, $TaBr_5$ or $SnI_4$, the noble metal halides include $AuCl_3$ or $HAuCl_4$, the organic materials include benzoquinone, tetrachlorobenzoquinone, tetracyanoquinodimethane or dichlorodicyanobenzoquinone, the alkali metals include Li, Na, K, or Cs, and the alkylammonium ions include tetraethylammonium ions or tetrabutylammonium ions.

8. The transparent CNT electrode according to claim 1, wherein the doped dispersant is a doped conductive dispersant.

9. The transparent CNT electrode according to claim 1, wherein the CNT composition consists essentially of CNTs and a doped dispersant.

10. The transparent CNT electrode according to claim 1, wherein the CNTs are selected from the group consisting of single-walled carbon nanotubes, double-walled carbon nanotubes, multi-walled carbon nanotubes, rope carbon nanotubes, and combinations thereof.

11. A device comprising:
a transparent CNT electrode comprising a transparent substrate and a CNT thin film directly on a surface of the transparent substrate, wherein the CNT thin film is a CNT composition comprising CNTs and a doped dispersant, and
wherein the transparent substrate is a transparent inorganic substrate selected from glass or quartz substrates, or a flexible transparent substrate made of a material selected from the group consisting of polyethylene terephthalate, polyethylene naphthalate, polyether sulfone, polycarbonate, polystyrene, polypropylene, polyester, polyimide, polyetheretherketone, polyetherimide, acrylic resins, olefin-maleimide copolymers, and norbornene resins, and
wherein the transparent CNT electrode has a visible light transmittance of 60% or more at a wavelength of 550 nm or 600 nm measured at a transparent CNT thin film thickness of about 150 nm and a transparent substrate thickness of about 150 μm.

* * * * *